(12) United States Patent
Pandharipande et al.

(10) Patent No.: US 10,444,334 B2
(45) Date of Patent: *Oct. 15, 2019

(54) CONTROLLING TRANSMISSION OF PULSES FROM A SENSOR

(71) Applicant: SIGNIFY HOLDING B.V., Eindhoven (NL)

(72) Inventors: Ashish Vijay Pandharipande, Eindhoven (NL); David Ricardo Caicedo Fernandez, Eindhoven (NL); Sriram Srinivasan, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,564

(22) Filed: Aug. 21, 2017

(65) Prior Publication Data

US 2017/0350969 A1    Dec. 7, 2017

Related U.S. Application Data

(63) Continuation of application No. 14/653,528, filed as application No. PCT/IB2013/060906 on Dec. 13, 2013, now Pat. No. 9,766,327.

(Continued)

(51) Int. Cl.
*G01S 7/524* (2006.01)
*G01S 7/526* (2006.01)
(Continued)

(52) U.S. Cl.
CPC ............. *G01S 7/524* (2013.01); *G01S 7/52* (2013.01); *G01S 7/526* (2013.01); *G01S 15/04* (2013.01);
(Continued)

(58) Field of Classification Search
CPC ............ H05B 33/0815; H05B 33/0827; H05B 37/0227; G01S 7/524; G01S 7/526;
(Continued)

(56) References Cited

U.S. PATENT DOCUMENTS 5,355,130 A    10/1994  Luber
6,988,026 B2 *  1/2006  Breed ................... G07C 5/008
                                                701/31.4

(Continued)

FOREIGN PATENT DOCUMENTS

JP    11985042981 U    3/1985
JP     1987140084 A    6/1987
(Continued)

*Primary Examiner* — Haissa Philogene
(74) *Attorney, Agent, or Firm* — Akarsh P. Belagodu

(57) ABSTRACT

A sensor such as a presence sensor for use in a lighting system or other system that adapts to information from a plurality of active presence sensors. If transmissions from the active sensors are uncoordinated, the overall detection performance may be adversely impacted (e.g. due to potential cross-interference), which may make sensing over the detection coverage area defined by a single presence sensor (or the like) become unreliable.

The disclosure presents protocols for coordinating transmissions in active sensing systems. The invention may be applied to various active modalities (e.g. ultrasound, RF), for example that find applications in indoor and outdoor lighting controls.

28 Claims, 3 Drawing Sheets

Related U.S. Application Data

(60) Provisional application No. 61/738,542, filed on Dec. 18, 2012.

(51) Int. Cl.
    *G01S 15/04*     (2006.01)
    *H05B 33/08*     (2006.01)
    *G01S 7/52*     (2006.01)
    *H05B 37/02*     (2006.01)
    *G01S 15/87*     (2006.01)

(52) U.S. Cl.
    CPC .......... *G01S 15/87* (2013.01); *H05B 33/0815* (2013.01); *H05B 33/0827* (2013.01); *H05B 37/0227* (2013.01); *Y02B 20/346* (2013.01)

(58) Field of Classification Search
    CPC . G01S 7/52; G01S 15/04; G01S 15/87; Y02B 20/346
    See application file for complete search history.

(56) References Cited

U.S. PATENT DOCUMENTS

| | | | |
|---|---|---|---|
| 7,089,099 B2 * | 8/2006 | Shostak | B60C 23/005 |
| | | | 701/29.6 |
| 9,766,327 B2 * | 9/2017 | Pandharipande | H05B 33/0815 |
| 9,857,458 B2 * | 1/2018 | Pandharipande | H05B 37/0227 |
| 2011/0087342 A1 | 4/2011 | Liano | |
| 2011/0105904 A1 | 5/2011 | Watanabe | |
| 2015/0093990 A1 | 4/2015 | Lin | |
| 2015/0338510 A1 | 11/2015 | Pandharipande | |

FOREIGN PATENT DOCUMENTS

| | | |
|---|---|---|
| JP | 1999166968 A | 6/1999 |
| JP | 2002323572 A | 11/2001 |
| JP | 2003194962 A | 7/2003 |
| JP | 2005288554 A | 10/2005 |
| JP | 2007232498 A | 9/2007 |
| JP | 2008292264 A | 12/2008 |
| JP | 2009080073 A | 4/2009 |
| JP | 2011094375 A | 5/2011 |
| WO | WO9514241 A1 | 5/1995 |
| WO | WO2009059462 A1 | 5/2009 |
| WO | WO2011151796 A1 | 12/2011 |
| WO | WO2012023087 A1 | 2/2012 |
| WO | WO2012053465 A1 | 4/2012 |

* cited by examiner

CONTROLLING TRANSMISSION OF PULSES FROM A SENSOR

CROSS-REFERENCE TO PRIOR APPLICATIONS

This application is a continuation application of U.S. application Ser. No. 14/653528, filed Jun. 18, 2014, which is a U.S. National Phase application under 35 U.S.C. § 371 of International Application No. PCT/IB2013/060906, filed Dec. 13, 2013, which claims the benefit of U.S. Patent Application No. 61/738542, filed Dec. 18, 2012. These applications are hereby incorporated by reference herein.

FIELD OF THE INVENTION

The present invention relates to controlling the transmission of pulses from a sensor for use amongst a plurality of sensors.

BACKGROUND

A presence sensor is a sensor for remotely sensing the presence of a being or other object, typically a person. For example the sensing of presence may comprise detecting whether or not the being or object is in motion, determining a measure of its motion (e.g. speed or velocity), determining its range from the sensor, and/or simply detecting the fact of its existence in a certain zone (e.g. defined by the range of the sensor).

Presence sensors come in two kinds: active or passive. An active presence sensor is one which transmits a probing waveform and then uses a reflection of that waveform received back at the sensor to detect presence, e.g. using certain signal characteristics in the reflected signal to determine presence-related information. Examples of active sensors include ultrasonic, radio (e.g. radar) and microwave sensors which emit pulses of ultrasonic, radio frequency (RF) or microwave radiation respectively and sense presence based on the reflection thereof. A passive presence sensor on the other hand does not transmit its own waveform but instead relies on radiation emitted by the being or object to be sensed, or reflected from it but originating from another source other than the sensor itself. Examples of passive sensors include infrared sensors which sense the infrared radiation given off by an object such as a person or other being, and light sensors which detect light reflected from the being or object being sensed (e.g. originating from the sun or electric lighting in a room).

Presence sensors have a wide range of applications. One such application is found in controlling a lighting system. For example office lighting typically constitutes almost 30% of the electrical consumption in office buildings. It is known that light control strategies based on occupant presence information can be the most effective in reducing energy consumption. Hence the design of green buildings typically involves presence-adaptive lighting control systems.

Active sensors like ultrasound sensors tend to provide better detection than passive infrared sensors in large volumetric spaces. In larger physical areas, it is commonplace to have multiple active presence sensors for proper detection coverage. When such presence sensing systems are deployed however, there is a potential for cross-interference across active transmissions. For the system as a whole to function properly, ideally each individual presence sensor should be able to determine presence-related information in its respective coverage area. Cross-interference across active sensors (e.g. ultrasound or RF) is a commonly encountered problem in indoor and outdoor sensing applications, which can affect proper operation of the sensing and control systems. For instance, a sensor may trigger a false alarm when an adjacent zone is occupied based on an overheard transmission from a neighboring sensor. Such sensing malfunction can disrupt the lighting control system as a whole.

For example, in WO 2012/023087 the problem of frequency misalignment is recognized to cause detection performance degradation when attempting to detect moving objects in continuous-wave Doppler radars. For radar units that transmit at nominally the same frequency, slight frequency differences will typically occur due to tolerances of elements in the frequency determining circuits. If a frequency difference between two neighboring radar units is comparable with the Doppler shift produced by a moving object, a radar unit may mistakenly detect the transmission signal of another radar unit as being reflection from a moving object. The problem is addressed by choosing different frequencies of operation for different radar units, so that any given radar unit transmits at a frequency that is outside the detection frequency range of any other radar unit in the system, and therefore frequency misalignment does not result in cross-interference. However, a frequency allocation such as described in WO 2012/023087 may not in itself be sufficient in all possible sensing applications. For example it may not be sufficient in an ultrasonic sensing system due to the narrowband frequency response range of the transmitter.

Active presence sensors may also be found in other applications where the problem of cross-interference may occur, or more generally where operation of one active sensor may affect one or more other sensors.

SUMMARY

It would be desirable to avoid potential cross-interference between active transmissions from different presence sensors, so that the system as a whole can function properly with each individual presence sensor being able to determine presence-related information in its respective coverage area. For example, this problem may occur in a lighting system that adapts to information from a network of active presence sensors. If transmissions from the active sensors are uncoordinated, the overall detection performance may be adversely impacted, making sensing over the detection coverage area defined by a single presence sensor become unreliable. Embodiments of the present invention present protocols for coordinating transmissions in active presence sensing systems to solve such problems. The invention may be applied to various active modalities (e.g. ultrasound or RF), e.g. of presence sensors that find applications in indoor and outdoor lighting controls.

More generally it may be desirable to control the transmission of pulses from one sensor in relation to one or more other sensors, whether to mitigate any interference or other undesired effect that may occur between sensors, or to obtain any desired effect that may be achieved through their synchronized operation.

According to one aspect of the disclosure herein, there may be provided apparatus for use in one of a system of sensors each having a respective transmitter which transmits pulses for sensing, and a respective receiver which receives echoed instances of said pulses; the apparatus comprising: sensing logic configured to sense a being or object in dependence on the echoed pulses received back by the respective receiver from the respective transmitter; and timing logic configured to control timing of the pulses transmitted from the respective transmitter; wherein each of a plurality of the sensors is to transmit its pulses on a different respective one of a plurality of resource slots over a plurality of frames, so that when transmitting each of the transmitters transmits one or more of the pulses on its respective resource slot per frame, the plurality of resource slots comprising a plurality of time slots and a plurality of frequency slots on at least one of the time slots; and the timing logic is configured select one of the resource slots for said one of the sensors, and to operate the respective transmitter to transmit its pulses on the time and frequency slot of the selected resource slot.

In embodiments, the plurality of resource slots may comprise the plurality of time slots and a plurality of frequency slots on some or each of the time slots.

In embodiments the timing logic may be configured to select one of the resource slots for said one of the sensors that is not used by any others of said plurality of sensors.

In embodiments said plurality of sensors may be a subset of the system of sensors, the subset being those within listening range of the respective receiver of said one of the sensors.

In embodiments the timing logic may be configured to receive a control signal from a controller, the control signal specifying said selected resource slot for said one of the sensors.

In embodiments the timing logic may be configured to detect which of the plurality of sensors are within listening range of the respective receiver, and to report the detected sensors to the controller, wherein the controller may receive a plurality of respective reports from the plurality of sensors and allocate the resource slots to sensors based on the reports so that no two sensors within listening range use a same one of the resource slots.

In embodiments one of the sensors may act as said controller.

In embodiments the timing logic may be configured to operate according to a distributed allocation scheme for selecting the resource slots, whereby the timing logic may be configured to select the resource slot for said one of the sensors by: using the respective receiver to listen for instances of the pulses from others of the sensors for an initial period of at least one frame before itself transmitting from the respective transmitter, based on said listening selecting one of the resources slots not already used by one of the other sensors, and using the selected resource slot in subsequent frames to transmit the pulses from the respective transmitter.

In embodiments the timing logic may be configured to operate without a dedicated control signal being communicated between the sensors or from a central controller, by instead performing said listening for instances of the pulses from the one or more other sensors.

In embodiments the apparatus may comprise receive processing logic configured to exclude, from said sensing, instances of the pulses estimated to be received from one or more others of the sensors, based on one or both of: (a) having a signal power that is low relative to a threshold, and/or (b) being received with a direction of arrival falling outside a range of directions.

According to another aspect of the disclosure herein, there may be provided apparatus for use in one of a system of sensors each having a respective receiver which receives echoed instances of pulses; the apparatus comprising: sensing logic configured to sense a being or object in dependence on the echoed pulses received by the respective receiver from a transmitter; and receive processing logic configured to exclude, from said sensing, instances of pulses estimated to be received from a source other than said transmitter, being excluded based on one or both of: (a) having a signal power that is low relative to a threshold, and/or (b) being received with a direction of arrival falling outside of a range of directions.

In embodiments the exclusion may be based on the direction of arrival being at an angle, relative to an axis along which the sensor is directed, that is high relative to a threshold.

In embodiments the receive processing logic may be configured to determine the direction of arrival based on phase information in the echoed instances of the pulses received at the respective receiver.

In embodiments the receive processing logic may be configured to further exclude, from said sensing, instances of pulses received from outside of a window of distances from respective receiver, said window being a sub-range within a total range of the respective receiver.

In embodiments each of the system of sensors may haves a respective transmitter which transmits pulses for sensing, and the respective receiver which receives echoed instances of said pulses; and the apparatus may comprise timing logic configured to control timing of the pulses transmitted from the respective transmitter; wherein: each of a plurality of the sensors may be to transmit its pulses on a different respective one of a plurality of resource slots over a plurality of frames, so that when transmitting each of the transmitters transmits one or more of the pulses on its respective resource slot per frame, the plurality of resource slots comprising a plurality of time slots and/or a plurality of frequency slots; and the timing logic may be configured to elect one of the resource slots for said one of the sensors, and to operate the respective transmitter to transmit its pulses on the time and/or frequency slot of the selected resource slot.

In embodiments the plurality of resource slots may comprise a plurality of time slots and a plurality of frequency slots on one, more or each of said time slots; and the timing logic may be configured to operate the respective transmitter to transmit its pulses on the time and frequency slot of the selected resource slot.

According to another aspect of the disclosure herein, there may be provided apparatus for use in one of a system of sensors each having a respective receiver which receives echoed instances of pulses, the system comprising a plurality of transmitters which transmit the pulses, each transmitter being associated with a different respective predetermined code and being configured to encode its respective predetermined code into the pulses transmitted from that transmitter; and the apparatus comprising: sensing logic configured to sense a being or object in dependence on the echoed pulses received back by the respective receiver from one of the plurality of transmitters; and receive processing logic configured to identify the predetermined code in instances of the pulses received by the respective receiver, and to exclude from said sensing instances of pulses not having the predetermined code of said one of the transmitters.

In embodiments, each of the sensors may comprise a respective one of the transmitters, the sensing logic being configured to sense a being or object in dependence on the echoed pulses received back by the respective receiver from the respective transmitter, and the receive processing logic may be configured to exclude instances of pulses not having the predetermined code of the respective transmitter.

According to another aspect of the disclosure herein, there may be provided apparatus for use in one of a plurality of sensors each having a respective transmitter which transmits pulses for sensing, and a respective receiver which receives echoed instances of said pulses; the apparatus comprising: sensing logic configured to sense a being or object in dependence on the echoed pulses received back by the respective receiver from the respective transmitter; and timing logic configured to synchronize timing of the pulses from the respective transmitter with the pulses from one or more others of the sensors, wherein the timing logic is configured to perform said synchronization based on an oscillating power supply common to each of the plurality of sensors.

In embodiments, each of the sensors may have a respective clock which controls timing of the pulses transmitted from the respective transmitter; and said synchronization may comprise compensating for a clock discrepancy between the respective clock and that of one or more others of the sensors, based on the oscillating power supply.

In embodiments, each of the sensors may be to transmit on a different respective time slot over a plurality of frames, so that when transmitting each of the transmitters transmits one or more of the pulses on its respective time slot per frame; and said synchronization may comprise preventing the transmission from the respective transmission on the respective time slot overlapping with the transmission from one or more others of the sensors on one or more others of the time slots.

According to another aspect disclosed herein, there may be provided a sensor comprising apparatus having any of the above features, and the respective receiver.

According to another aspect disclosed herein, there may be provided a sensor comprising apparatus having any of the above features, and the respective transmitter and receiver.

In embodiments, each of the plurality of sensors may comprise an ultrasonic sensor, each respective transmitter comprising one or more ultrasonic transmitters for transmitting the pulses in the form of ultrasonic pulses for performing said sensing, and the respective receiver comprising one or more ultrasonic receivers for receiving the ultrasonic pulses.

According to another aspect disclosed herein, there may be provided a system comprising a plurality of said sensors, each comprising an instance of the apparatus having any of the above features.

In embodiments the system may further comprise said controller.

In embodiments, multiple of the sensors may be receiver nodes comprising the respective receiver but no transmitter for transmitting pulses for sensing, wherein the system may comprise said transmitter being a single transmitter amongst the multiple of receiver nodes.

In embodiments, one of the sensors is a transmitter node comprising the transmitter as well as its respective receiver.

In embodiments: the system may be divided into zones each comprising a respective group of the sensors, each group may comprise multiple of the sensors being receiver nodes comprising the respective receiver but no transmitter for transmitting pulses for sensing, each group may comprise a respective transmitter configured to transmit ones of the pulses for performing said sensing, and the zones may be arranged so that each receiver can only hear the respective transmitter of its respective group.

According to another aspect disclosed herein, there may be provided a computer program product for operating one of a plurality of sensors, the computer program product comprising code embodied on a computer-readable storage medium and configured so as when executed on a processing apparatus of said one of the sensors to perform operations in accordance with any of the above features.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of embodiments of the present invention and to show how they may be put into effect, reference is made by way of example to the accompanying drawings in which.

DETAILED DESCRIPTION OF PREFERRED EMBODIMENTS

Embodiments of the present invention are described with respect to an ultrasound array sensor, although the ideas may be applied to other sensor modalities such as RF and light, and multi-modal sensors as well as array sensors such as described in WO 2011/151796. In an example application embodiments of the invention can be used for active presence sensing systems in different indoor and outdoor lighting and building control applications.

Figure 1:
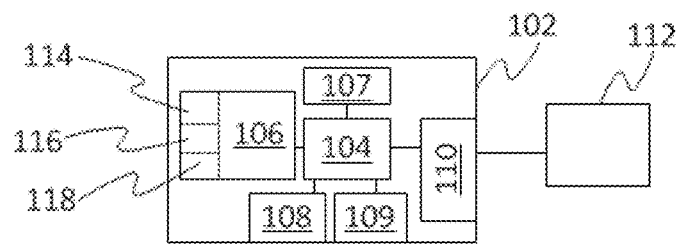
FIG. 1 is a schematic block diagram of a presence sensor.

FIG. 1 is a schematic block diagram illustrating an example presence sensor 102 according to embodiments of the present invention.

The sensor 102 comprises a wireless transmitter 108 and receiver 109, the transmitter 108 for transmitting a signal in the form of pulses of radiation for the purpose of sensing, and the receiver 109 for receiving a signal in the form of echoes of those pulses reflected back from beings or other objects within range of the receiver 109. For example the transmitter 108 may comprise an ultrasound transmitter for transmitting ultrasound pulses or an RF or microwave transmitter for transmitting RF or microwave pulses, and the receiver 109 may comprise an ultrasound, RF or microwave receiver respectively. In embodiments each receiver may comprise a receiver array having a plurality of receiver elements for performing sensing as outlined below.

The sensor 102 also comprises a clock 107, and port 110 for connecting to a part of a lighting system, e.g. to a lighting control element 112 of one or more luminaires. Further, the sensor 102 comprises apparatus for operating the sensor, comprising sensing logic 114 operatively coupled to the clock 107, transmitter 108, receiver 109 and port 110; and timing logic 116 operatively coupled to the clock 107, transmitter 108 and receiver 109. The sensing logic 114 is configured to process the pulses received from the receiver 109 in relation to the pulses transmitted from the transmitter 108, to thereby sense presence-related information in dependence on a reflection (echo) of the pulses, e.g. in the manner described below. The timing logic 116 is configured to controlling the timing of the pulses transmitted from the transmitter 108 under the influence of the clock 107, e.g. again in the manner described below.

In embodiments, the sensor 102 comprises processing apparatus in the form of a processor 104 or "CPU" (central processing unit) having one or more execution units, and storage in the form of a memory 106 comprising one or more storage media such as a magnetic storage medium (e.g. hard drive) and/or electronic storage medium (e.g. "flash" memory or other EEPROM). Each of the sensing logic 114 and/or timing logic 116 may be implemented as modules of code stored in the memory 106 and arranged to be executed on the processor 104. Alternatively each of the sensing logic 114 and/or timing logic 116 may be implemented wholly or partially in dedicated hardware circuitry, or configurable hardware circuitry such as an FPGA (field programmable gate array).

Figure 2A:
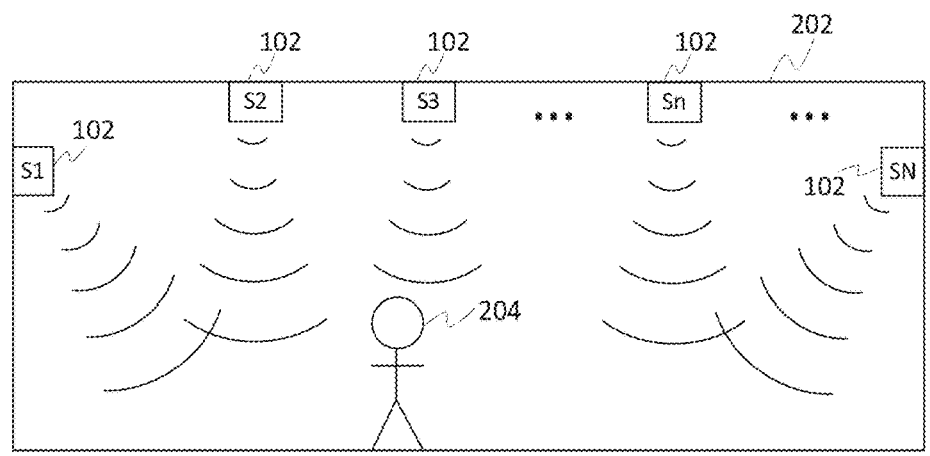
FIG. 2a is a schematic illustration of a distributed system of presence sensors.
Figure 2B:
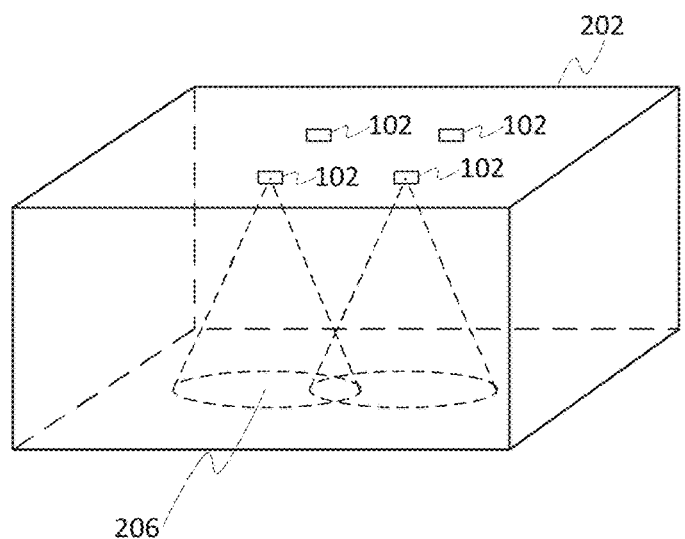
FIG. 2b is another schematic illustration of a distributed system of presence sensors.

FIGS. 2a and 2b provide schematic illustrations of an example sensing system comprising a plurality of sensors 102. Each of the sensors 102 is located at a different point and/or directed in a different respective direction, e.g. each sensor 102 may be mounted at a different spot on the walls and/or ceiling of a room 202. For illustrative purposes the different sensors 102 are numbered here 1 . . . N and labeled as sensors S1 . . . SN.

Each sensor 102 comprises a respective instance of the clock 107, transmitter 108, receiver 109, port 110 and apparatus comprising sensing logic 114 and timing logic 116 (e.g. implemented on a respective processor 104 and memory 106). In embodiments each sensor comprises a respective instance of substantially the same clock 107, sensing logic 114 and timing logic 116. In embodiments, the timing logic 116 in each sensor 102 may be configured to operate autonomously of the other sensors 102, but to operate according to the same set of rules as the timing logic 116 in each of the other sensors 102.

In other embodiments the timing logic 116 in each of the sensors may be coupled to a central controller so as to coordinate the active sensing by the multiple sensors 102.

The sensing logic 114 in each sensor 102 is arranged to sense presence-related information from a respective coverage region, e.g. corresponding to an area 206 on the floor or three dimensional volume. The coverage region may be defined by the range of the sensor 102, i.e. of its transmitter 108 and/or receiver 109. As shown in FIG. 2b, one or more of the sensors 102 may be within listening range of one or more others of the sensors 102 such that the coverage regions 206 overlap.

The presence-related information which the sensing logic 114 in each sensor 102 is configured to sense may for example comprise information as to whether an object is sensed to be moving, the range of an object, or simply the fact of whether an object or a particular object is detected to be found in a certain place. The sensing logic may be configured to sense an object 204 in the form of a living being, e.g. a person (human) or other living creature, or some other non-living article such as an animated manmade device, or any of these. The term "object" is not intended to be limiting. An example based on detecting motion is described below, but examples of other active presence sensing techniques in themselves will be familiar to a person skilled in the art.

Sensing logic 114 may be connected via the port 110 to an element of a system such as a control element 112 of a lighting system, and arranged to provide it with an output signal indicative of the sensed presence (or lack thereof).

The element 112 may be configured to control one or more luminaries in dependence on the output signal, e.g. to turn on lighting in a certain zone when presence is detected by a sensor 102 whose coverage region corresponds to that zone, or turn off the lighting in that zone when no presence is detected. In embodiments, each sensor 102 may be connected via its respective port 110 to a common lighting controller which controls a plurality of luminaires based on the output signals from the sensors 102, or alternatively each sensor 102 may connected via its respective port 110 to control its own respective individual luminaire.

Regardless of whether the lighting is controlled centrally or individual luminaires are controlled based on respective sensors 102, this does not necessarily imply that any central control of the sensing functionality is needed. In embodiments the timing logic is configured to operate without a dedicated timing signal being communicated between the sensors or from a central controller, by instead listening for instances of the pulses from the one or more other sensors, e.g. as will be described shortly. In exemplary embodiments the sensing function may be entirely distributed amongst the sensors 102 with no central controller being involved for that purpose at least. That is, each sensor 102 only receives as an input the reflections of the transmitted pulses via the receiver 109, and the port 110 is only for outputting the sensed presence related information to a control element for controlling another aspect of the system, e.g. controlling lighting. Control information need not pass in the other direction from controller to sensor 102. However in other embodiments the sensors 102 may be coupled to a central controller to coordinate the sensing function. Examples of both types of technique will be discussed in the following.

Figure 3:
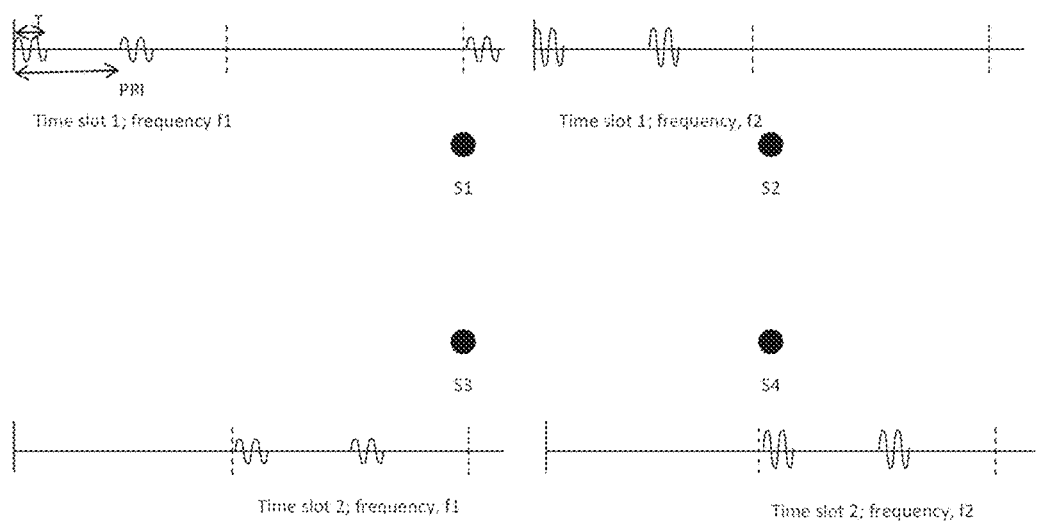
FIG. 3 is a schematic timing diagram illustrating a multiplexed active transmission sensing protocol.

FIG. 3 provides a schematic timing diagram illustrating operation of the sensors 102 in accordance with one or more embodiments of the present invention.

In embodiments, each of the sensors is to transmit on a different respective time slot over a plurality of frames. Thus when transmitting, each of the transmitters transmits one or more of the pulses on its respective time slot per frame. For example the transmitter 108 sends out a signal comprising a waveform such as that depicted in FIG. 3 over an area 206 defined by the directivity of the transmitter. The waveform comprises one or more sensing pulses per frame transmitted on the respective time slot in each frame. In the illustrated example the pulses are sinusoidal and two pulses are transmitted from each sensor per frame (but alternative waveforms such as those using rectangular pulses or a different number of pulses per frame may also be employed). At the corresponding receiver side, the received signals are processed in order to arrive at presence-related sensing information.

For example each presence sensor 102 may work as follows. The transmitter 108 sends out pulsed sinusoids of length T within a transmission slot of length $T_{slot}$, consisting of two transmission periods PRI (pulse repetition interval). At the corresponding receiver 109, the sensing logic 114 obtains a difference signal by subtracting echoes corresponding to the consecutive transmission periods. For a static object, the echoes over consecutive transmission periods are almost identical and cancel out in the difference signal. A moving object on the other hand results in amplitude and phase differences in corresponding echoes over consecutive transmission periods, producing non-zero difference components. A power detector in the sensing logic 114 is then used to determine the time-of-flight, and hence the range, and the phase differences across the array elements of the receiver are used to extract angular information using a direction-of-arrival (DOA) beamformer. The parameter PRI may be chosen so that the sensor may process echoes from the farthest object that is of interest within its range.

As mentioned, cross-interference across active sensors such as ultrasound sensors is a potential problem in indoor and outdoor sensing applications, which may affect proper operation of the sensing and control systems. For instance, a sensor may trigger and create a false alarm when an adjacent zone is occupied based on an overheard transmission from a neighboring sensor, disrupting the lighting control system as a whole.

In some systems such as an ultrasonic sensing system, a frequency allocation such as described in WO 2012/023087 may not in itself be sufficient due to the narrowband frequency response range of the transmitter. Moreover, a time slotted scheme may not in itself be suitable for a presence detection application since it would lead to unacceptable latencies in determining user presence. It is an object of the following embodiments to address these shortcomings.

Each ultrasound sensor 102 comprises a transmitter 108 that sends out a waveform such as depicted in FIG. 3 over an area 206 defined by the directivity of the transmitter. (Alternate waveforms such as rectangular pulses may be employed). At the corresponding receiver side 109, the received signals are processed in order to arrive at presence-related sensing information.

According to a first embodiment, there is provided an active transmission protocol that is both frequency and time multiplexed. A timing diagram depicting such a protocol is shown in FIG. 1 for the case of four sensors that are within listening range of each other. In the first slot (of duration 2*PRI), sensor S1 transmits at frequency f1 and sensor S2 transmits at frequency f2. Frequency f2 is chosen such that it is outside within a range of frequencies induced by Doppler-shifts due to user movements on the transmitting frequency f1, and vice-versa. The received echoes are processed at the individual receivers 109 after suitable bandpass filtering at the respective center frequencies. In this time window, sensors S3 and S4 are silent. The parameter PRI is chosen so that the sensor may process echoes from the farthest object that is of interest within its coverage area. As such, a particular sensor is allotted a time window within which the echo signals corresponding to the transmitted bursts sent from its transmitter need to be received.

Thus, the time and frequency slots are exclusive of one another, i.e. so they do not overlap in the time and frequency domain respectively.

Using both time and frequency division multiplexing in the active transmission advantageously provides a balance between the bandwidth needed for frequency division multiplexing and the time delay incurred by time division multiplexing. With this balance, the bandwidth and time delay are considered suitable for operating ultrasonic sensors in many applications.

There are now described some schemes for assigning time slots and frequencies such that no two sensors within listening range are assigned the same time slot and frequency. Both centralized and distributed allocation schemes are considered.

In a centralized allocation scheme, a unique identifier is assigned to each sensor 102, that is known to a centralized controller as well as to the sensors. Each sensor 102 transmits over a duration 2*PRI sequentially, while listening over durations when not transmitting. Each sensor 102 reports to the centralized controller the identifiers of sensors that it can hear. Based on the sensor reports, the centralized controller builds a sensor-connectivity graph wherein the nodes of the graph are labeled with the sensor identifiers and a vertex between two sensors is created if they have reported to have heard an ensuing transmission. Based on such a graph, an allocation of time slots and frequencies may be done using any one of known coloring algorithms. That is, the graph is computed so that no node is allowed to transmit on the same time and frequency slot as any other node that is within listening range.

In some embodiments, the central controller is implemented in logic at one of the sensors 102 acting as a master to the other sensors 102, e.g. in code stored on the memory 106 and executed on the processor 104 of that one of the sensors 102. In other embodiments, the central controller may be a dedicated control unit (not shown).

In a distributed case, there is no central controller, and no information about a sensor 102 (e.g. identifier) is assumed to be known to the other sensors 102. Moreover, no explicit communication is allowed between the different nodes 102.

At the beginning, the received signal at each sensor 102 is bandpass filtered with central frequency f1. Each sensor seeks for a free time slot of duration 2*PRI (i.e. no sensor 102 is actively transmitting during that time). A time slot of duration 2*PRI is considered free, if the power of the filtered received signal during that window is below a predefined threshold. Note that the transmission of a neighboring sensor 102 is received if the neighboring sensor is at listening range and hence, a high received power is indication of the active transmission of a neighboring sensor in that time slot. Further, in order to avoid two sensors 102 being assigned the same time slots, a random delay is enforced before a sensor seeks for a free time slot.

When all time slots at frequency f1 have been allocated, the remaining non-allocated sensors 102 move to a new frequency f2. Now, the received signal is bandpass filtered with central frequency f2 and each sensor proceeds to seek for a free timeslot of duration 2*PRI at frequency f2. This procedure is repeated until all the sensors 102 are allocated or there are no more available timeslots and frequencies. A consequence of this protocol is that each sensor 102 gets its time window for transmission and reception approximately every 2*N*PRI, where N is the number of assigned time slots.

According to a second embodiment, there is provided a protocol for synchronized concurrent active transmissions. Transmissions from the multiple sensors 102 are synchronized in time and frequency. To achieve synchrony in time, a central controller (not shown) sends out a control signal to which the sensors 102 react. Alternatively, one of the sensors 102 may assume the role of a master and send such a control signal. Upon receiving such a signal, the sensors 102 begin their transmissions. This ensures that adverse cross-talk effects due to asynchrony in simultaneous transmissions are limited. However echoes from moving sources may still appear in the received signals of multiple sensors 102 and may have to be processed for reliable presence sensing.

Accordingly, an additional receive processing logic 118 may be provided at each sensor 102, operatively coupled to the respective receiver 109. The receive processing logic may be implemented as code stored in the respective memory 106 and arranged for execution on the respective processor 104, or in hardware logic, or a combination of these. The receive processing 118 logic is configured to apply additional processing to the received signals to filter out unwanted signals before being passed to the sensing logic 114, as exemplified in the following.

Consider a use case where the following lighting system control strategy is employed. If a sensor 102 determines presence within a physical zone 206 that is covered by it, a suitable illumination level (e.g. 500 lux) has to be provided over the zone. Different parameters (e.g. transmission power, directivity) applied in the receiver processing logic 118 of the sensors 102 may be adapted to limit the coverage area of a sensor. Coverage areas 206 of neighboring sensors may still overlap. Given these coverage areas, when an active transmission occurs from the multiple transmitters 108, the received echoes that arrive at a given sensor 102 may be from multiple transmitters. This means that for a single occupant, there may be different echoes with possibly different time-of-arrivals at a sensor. This in turn means that there is ambiguity in range determination.

To avoid or mitigate this, the receive processing logic 118 may be configured to compute the power of the received echo signals and compare it with a detection threshold. Only those signals exceeding the threshold are then processed by the sensing logic 114. In this way, a sensor 102 can determine presence in its own coverage area 206.

Another use case involves a single transmitter/receiver node 102 (which both transmits and receives sensing pulses) and multiple receiver nodes 102 (each of which only receives pulses and does not transmit pulses for sensing). It is assumed that the clocks 107 of all the nodes 102 are synchronized, and that the nodes 102 have knowledge of the PRI and the time instant when the first pulse is transmitted. They can therefore automatically switch to listen mode as soon as each transmission cycle is complete. The range of the transmitter is such that it covers the area 206 where presence needs to be detected. With this setting, each receiver 109, 114, 118 can process its signal to extract presence and range information using moving target processing. As discussed, in moving target processing, a difference signal is computed of the received echo signals corresponding to two transmitted periods. Signal power is computed over different time windows of this difference signal. If the signal power exceeds a detection threshold (e.g. depending on noise power), a moving source is declared to be present in that time window. Subsequently, the corresponding time-of-flight is computed and in turn the range of a moving source. Such an arrangement may also include an array of receivers at each node 102, which would enable more advanced signal processing, e.g. direction of arrival (DoA) estimation and target tracking. Having a set of distributed receiver nodes provides presence information with greater resolution than with a single receiver node. Having a single transmitter node has the advantage of eliminating ambiguity regarding the source of the received echoes.

Figure 4:
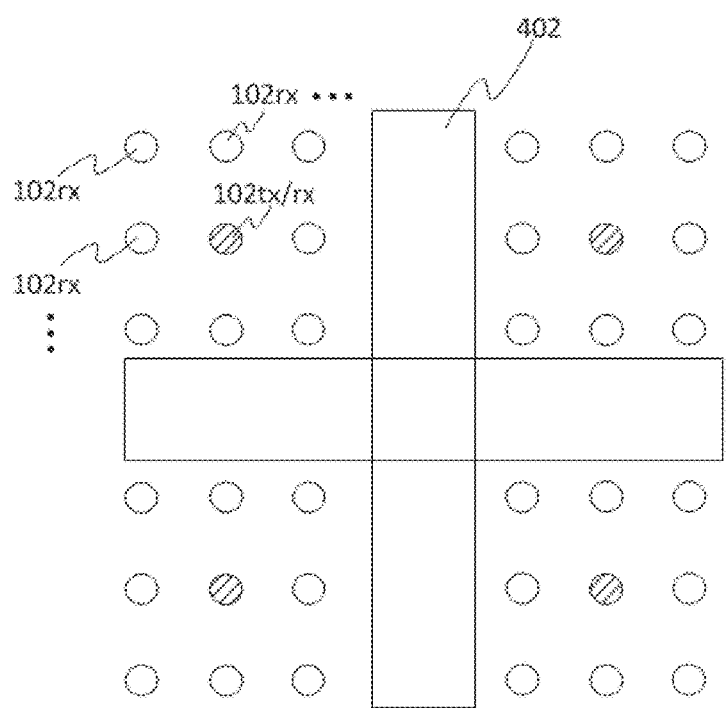
FIG. 4 is a schematic illustration of a distributed receiver set-up for a sensing system.

Referring by way of example to FIG. 4, a different use case involving the single-transmitter distributed-receiver set-up addresses large spaces where a single transmitter may not have sufficient power to span the entire area. The space is divided into non-overlapping zones. Each zone contains the single-transmitter node 102tx/rx and multiple distributed receiver nodes 102rx as described in the previous use case. The zones are designed such that the signal from a specific transmitter 108 cannot be heard outside its zone. A consequence of such a design is the existence of 'holes' 402 in the space where presence cannot be detected as these regions are outside the range of any transmitter 108. In a careful design, this need not necessarily be a disadvantage. In a large open office space for instance, the zones may be designed such that the holes occur in the walkways between different sections of the office which are always lit-up and therefore do not need presence sensing. Note that in this case, only the nodes 102 within a zone may need be synchronized in time.

Figure 5:
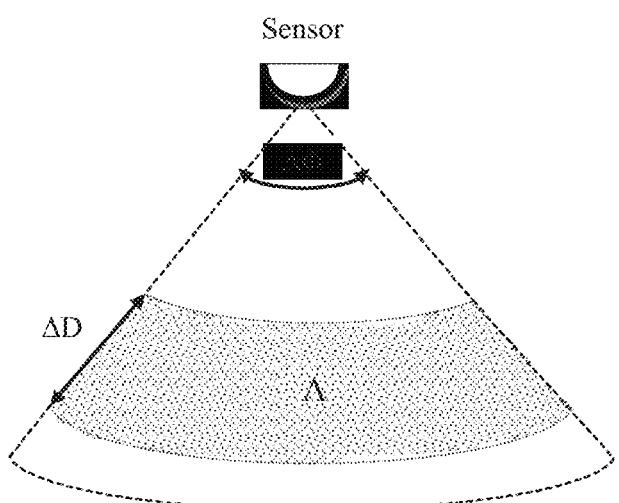
FIG. 5 is a schematic illustration of a presence sensor scanning angle and range.

A third embodiment is illustrated in FIG. 5. According to this embodiment, the receive processing logic 118 is configured to limit the range of scanning angles and range of the respective sensor 102 using an array of receiver elements of that node 102. In this embodiment, the receiver 109 of a sensor 102 is comprised of an array of receiver elements (constituent receivers) and a single (or multiple) transmitters 108. The array of receiver elements allows the receive processing logic 118 to estimate the DoA of incoming signals using the phase information in the echoes at different receiver elements. Using this information with range estimation, the source of the echoes can be localized so as to decide if the estimated location is in the coverage area of interest. Furthermore, the scanning angle and range of the sensor may be limited to cover the area of interest, $\Lambda$. This is achieved by processing those echoes that are received within the beam angle $\Delta\Phi$ (relative to the axis in the direction of the sensor) and range window $\Delta D$ while discarding all the others.

Note that the beam angle $\Delta\Phi$ and the range window $\Delta D$ corresponds to a part of the maximum scanning angle and range of the sensor 102, respectively. This method can be combined with the previous embodiments to further limit the coverage area of a sensor 102 via software and so limit interference in a network of active sensors 102.

According to a fourth embodiment, a uniquely coded transmitted signal is employed, with the code known a priori by the receive processing logic 118 at the receiver side 109. As such, received signal components that correspond to a code different from that which is anticipated at the receiver 109 may be filtered before further processing by the sensing logic 114.

Such approaches applied at the receive processing logic 118 may be extended to discard other unwanted signal elements, e.g. interference from sources other than just other transmitting sensors 102, creating radiation in a same or overlapping frequency range.

According to a fifth embodiment, the timing logic 116 is configured to synchronize the transmission of its own pulses relative to other sensors 102 by exploiting the existence of an oscillating power supply common to those sensors.

The clock 107 in each sensor 102 may be substantially the same in that they oscillate with the same nominal clock frequency, but it will be appreciated that each clock 107 will typically have a different respective clock error in its frequency, e.g. due to age, temperature and/or manufacturing spread. This may cause a discrepancy in that, when used to clock the transmission of pulses from the different sensors 102, the relative timing of these transmissions may differ.

In some embodiments the different sensors 102 may be synchronized or clocked by a central controller, or a master one of the sensors 102 acting as a controller, or obtain a common timing reference from elsewhere, or simply be provided with clocks that have sufficient accuracy (e.g. only drift off over a very long time period and so can be occasionally re-calibrated manually).

However in other embodiments, the timing logic 116 in each sensor 102 is configured to synchronize its respective clock 107 relative to an AC power supply of the respective sensor 102, to compensate for a timing difference between the clocks 107 of the different sensors 102. The synchronization may further comprise selecting a time slot on which to transmit the pulse form the respective sensor 102, and timing the transmission on the selected timeslot based on the synchronized clock 107 compensated for the time difference. Thus the devices may maintain global synchronization, without communicating with one another, e.g. by locally synchronizing to the local zero crossings of the AC mains supply. This may be applied when slots have already been pre-assigned and each sensor knows when other sensors are starting their transmissions, then synchronization may be kept with this powerline solution.

It will be appreciated that the above embodiments have been described only by way of example.

For instance while the above has been described for use in a lighting system, e.g. for active presence sensing systems in different indoor and/or outdoor lighting, the invention is not limited to lighting systems and can find applications in other areas such as other building control applications. Further, the invention is not limited to ultrasonic sensing, and other options include active sensing based on radio frequencies, microwave or other forms of radiation. Further, the invention is not limited to any particular algorithm for sensing presence, or to sensing any particular aspect of presence such as motion. The invention may be applied in any scenario where it may be desirable to control the transmission of pulses from one sensor in relation to one or more other sensors, whether to mitigate any interference or other undesired effect that may occur between sensors, or to obtain any desired effect that may be achieved through their synchronized operation. If it is said that a value exceeds or is outside of a threshold, this may refer to a condition based on being greater than the threshold, or greater than or equal to the threshold—both are ways of determining the value is high relative to the threshold or limit. Equivalently, if it is said that a value does not exceed or is within a threshold, this may refer to a condition based on being less than the threshold, or less than or equal to the threshold—both are ways of determining the value is low relative to the threshold or limit.

Further, while the above has been exemplified in terms of some particular embodiments comprising certain combinations of features, any of the features of any of the embodiments described herein may be used in conjunction with any others of the features of any other embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Apparatus for use in one of a system of sensors each having a respective receiver which receives echoed instances of pulses; the apparatus comprising:
    sensing logic configured to sense a being or object in dependence on the echoed pulses received by the respective receiver from a transmitter; and
    receive processing logic configured to exclude, from said sensing, instances of pulses estimated to be received from a source other than said transmitter, being excluded based on one or both of: (a) having a signal power that is low relative to a threshold, and/or (b) being received with a direction of arrival falling outside of a range of directions.

2. The apparatus of claim 1, wherein the exclusion is based on (a) having a signal power that is low relative to the threshold.

3. The apparatus of claim 1, wherein the exclusion is based on (b) being received with a direction of arrival being outside of a range of directions.

4. The apparatus of claim 3, wherein the exclusion is based on the direction of arrival being at an angle, relative to an axis along which the sensor is directed, that is high relative to a threshold.

5. The apparatus of claim 3, wherein the receive processing logic is configured to determine the direction of arrival based on phase information in the echoed instances of the pulses received at the respective receiver.

6. The apparatus of claim 1, wherein the receive processing logic is configured to further exclude, from said sensing, instances of pulses received from outside of a window of distances from respective receiver, said window being a sub-range within a total range of the respective receiver.

7. The apparatus of claim 1, wherein each of the system of sensors has a respective transmitter which transmits pulses for sensing, and the respective receiver which receives echoed instances of said pulses; and
    the apparatus comprises timing logic configured to control timing of the pulses transmitted from the respective transmitter;
    wherein each of a plurality of the sensors is to transmit its pulses on a different respective one of a plurality of resource slots over a plurality of frames, so that when transmitting each of the transmitters transmits one or more of the pulses on its respective resource slot per frame, the plurality of resource slots comprising a plurality of time slots and/or a plurality of frequency slots; and
    the timing logic is configured to select one of the resource slots for said one of the sensors, and to operate the respective transmitter to transmit its pulses on the time and/or frequency slot of the selected resource slot.

8. The apparatus of claim 7, wherein the plurality of resource slots comprises a plurality of time slots and a plurality of frequency slots on one, more or each of said time slots; and
    the timing logic is configured to operate the respective transmitter to transmit its pulses on the time and frequency slot of the selected resource slot.

9. A sensor comprising the apparatus according to claim 1, and the respective receiver.

10. A sensor comprising the apparatus of claim 7, and the respective transmitter and receiver.

11. The sensor of claim 9, wherein each of the plurality of sensors comprises an ultrasonic sensor, the pulses being ultrasonic pulses for performing said sensing, and each respective receiver comprising one or more ultrasonic receivers for receiving ultrasonic pulses.

12. A system comprising a plurality of said sensors, each according to claim 9.

13. The system of claim 12, wherein multiple of the sensors are receiver nodes comprising the respective receiver but no transmitter for transmitting pulses for sensing, and wherein the system comprises said transmitter being a single transmitter amongst the multiple of receiver nodes.

14. The system of claim 13, wherein one of the sensors is a transmitter node comprising the transmitter as well as its respective receiver.

15. The system of claim 13, wherein:
the system is divided into zones each comprising a respective group of the sensors,
each group comprises multiple of the sensors being receiver nodes comprising the respective receiver but no transmitter for transmitting pulses for sensing,
each group comprises a respective transmitter configured to transmit ones of the pulses for performing said sensing, and
the zones are arranged so that each receiver can only hear the respective transmitter of its respective group.

16. A computer program product for operating one of a plurality of sensors each having a respective receiver which receives echoed instances; the computer program product comprising code embodied on a non-transitory a computer-readable storage medium and configured so as when executed on a processing apparatus of said one of the sensors to perform operations of:
sensing a being or object in dependence on the echoed pulses received by the respective receiver from a transmitter; and
excluding, from said sensing, instances of pulses estimated to be received from a source other than said transmitter, being excluded based on one or both of having a signal power that is low relative to a threshold, and/or (b) being received with a direction of arrival falling outside of a range of directions.

17. Apparatus for use in one of a system of sensors each having a respective receiver which receives echoed instances of pulses, the system comprising a plurality of transmitters which transmit the pulses, each transmitter being associated with a different respective predetermined code and being configured to encode its respective predetermined code into the pulses transmitted from that transmitter; and the apparatus comprising:
sensing logic configured to sense a being or object in dependence on the echoed pulses received back by the respective receiver from one of the plurality of transmitters; and
receive processing logic configured to identify the predetermined code in instances of the pulses received by the respective receiver, and to exclude from said sensing instances of pulses not having the predetermined code of said one of the transmitters.

18. The apparatus according to claim 17, wherein each of the sensors comprises a respective one of the transmitters, the sensing logic being configured to sense a being or object in dependence on the echoed pulses received back by the respective receiver from the respective transmitter, and the receive processing logic being configured to exclude instances of pulses not having the predetermined code of the respective transmitter.

19. A sensor comprising the apparatus of claim 17, and the respective receiver.

20. A sensor comprising the apparatus of claim 18, and the respective receiver and transmitter.

21. A system comprising a plurality sensors, each according to claim 19.

22. A computer program product for operating one of a plurality of sensors each having a respective receiver which receives echoed instances of pulses, the system comprising a plurality of transmitters which transmit the pulses, each transmitter being associated with a different respective predetermined code and being configured to encode its respective predetermined code into the pulses transmitted from that transmitter; and the computer program product comprising code embodied on a non-transitory computer-readable storage medium and configured so as when executed on a processing apparatus of said one of the sensors to perform operations of:
sensing a being or object in dependence on the echoed pulses received back by the respective receiver from one of the plurality of transmitters,
identifying the predetermined code in instances of the pulses received by the respective receiver, and
excluding from said sensing instances of pulses not having the predetermined code of said one of the transmitters.

23. Apparatus for use in one of a system of sensors each having a respective transmitter which transmits pulses for sensing, and a respective receiver which receives echoed instances of said pulses; the apparatus comprising:
sensing logic configured to sense a being or object in dependence on the echoed pulses received back by the respective receiver from the respective transmitter; and
timing logic configured to synchronize timing of the pulses from the respective transmitter with the pulses from one or more others of the sensors, wherein the timing logic is configured to perform said synchronization based on an oscillating power supply common to each of the plurality of sensors.

24. The apparatus of claim 23, wherein each of the sensors has a respective clock which controls timing of the pulses transmitted from the respective transmitter; and said synchronization comprises compensating for a clock discrepancy between the respective clock and that of one or more others of the sensors, based on the oscillating power supply.

25. The apparatus of claim 23, wherein each of the sensors is to transmit on a different respective time slot over a plurality of frames, so that when transmitting each of the transmitters transmits one or more of the pulses on its respective time slot per frame; and said synchronization comprises preventing the transmission from the respective transmission on the respective time slot overlapping with the transmission from one or more others of the sensors on one or more others of the sensors on one or more others of the times slots.

26. A sensor comprising the apparatus of claim 23, and the respective receiver and transmitter.

27. A system comprising a plurality sensors, each according to claim 26.

28. A computer program product for operating one of a plurality of sensors each having a respective transmitter which transmits pulses for sensing, and a respective receiver which receives echoed instances of said pulses; the computer program product comprising code embodied on a non-transitory computer-readable storage medium and configured so as when executed on a processing apparatus of said one of the sensors to perform operations of:
sensing a being or object in dependence on the echoed pulses received back by the respective receiver from the respective transmitter; and
synchronizing timing of the pulses from the respective transmitter with the pulses from one or more others of the sensors, wherein said synchronization is performed based on an oscillating power supply common to each of the plurality of sensors.

* * * * *